United States Patent
Ramesh et al.

(10) Patent No.: US 10,565,066 B1
(45) Date of Patent: Feb. 18, 2020

(54) METHOD AND SYSTEM TO PROVIDE DATA PROTECTION THROUGH LIGHT FIDELITY NETWORK

(71) Applicant: EMC IP Holding Company LLC, Hopkinton, MA (US)

(72) Inventors: Kruthi Ramesh, Bangalore (IN); Mahantesh M. Ambaljeri, Bangalore (IN); Iresha Gadikar, Bangalore (IN); Ramesh Chilukoti, Bangalore (IN); Srinivasan Govindaraju, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 260 days.

(21) Appl. No.: 15/396,248

(22) Filed: Dec. 30, 2016

(51) Int. Cl.
*G06F 11/14* (2006.01)
*H04L 29/06* (2006.01)

(52) U.S. Cl.
CPC ........ *G06F 11/1464* (2013.01); *H04L 63/123* (2013.01); *G06F 2201/84* (2013.01)

(58) Field of Classification Search
CPC combination set(s) only.
See application file for complete search history.

(56) References Cited

U.S. PATENT DOCUMENTS

| | | | |
|---|---|---|---|
| 6,883,028 B1* | 4/2005 | Johnson | H04L 29/12066 709/203 |
| 2009/0031426 A1* | 1/2009 | Dal Lago | G06F 21/6245 726/26 |
| 2015/0205851 A1* | 7/2015 | Freedman | H01B 7/292 707/634 |
| 2016/0005229 A1* | 1/2016 | Lee | G06F 3/0488 345/419 |
| 2016/0156575 A1* | 6/2016 | Jeong | H04L 51/10 709/206 |
| 2016/0241642 A1* | 8/2016 | Liu | H04L 63/08 |

OTHER PUBLICATIONS

Mohammed Zafar Faraz and Aditya Ambasth, LI-FI Based Data Storage Device, Jul.-Aug. 2016, International Journal of Computer Science Trends and Technology, vol. 4 Issue 4, pp. 261-265. (Year: 2016).*

* cited by examiner

*Primary Examiner* — Hosain T Alam
*Assistant Examiner* — Anthony G Gemignani
(74) *Attorney, Agent, or Firm* — Womble Bond Dickinson (US) LLP

(57) ABSTRACT

Method to provide data protection through light fidelity network is disclosed herein. Method starts with a data protection server (DPS) that is enabled with light fidelity (Li-Fi) receiving a backup request from a first client device through a Li-Fi network. The first client device is enabled with Li-Fi. DPS registers the first client device through the Li-Fi network and triggers to start the backup of the first client device to a storage included in DPS. DPS receives a registration request from a proxy server for the DPS via a network, and registers the proxy server. DPS receives via the proxy server a backup request from a second client device for backup to the DPS. The second client device and the proxy server are enabled with Li-Fi DPS triggers to start the backup of the second client device to the storage included in the DPS. Other embodiments are described.

20 Claims, 4 Drawing Sheets

METHOD AND SYSTEM TO PROVIDE DATA PROTECTION THROUGH LIGHT FIDELITY NETWORK

FIELD OF THE INVENTION

Embodiments of the present invention relate generally to data storage systems. More particularly, embodiments of the invention relate to providing data protection during backup to a data storage server or to a proxy server to the DPS using a light fidelity network.

BACKGROUND

The ability to backup data and restore lost data is an important function of modern computer systems. However, the implementation of backup and restore functions is complex.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. A local client data backup application prepares and sends data from the local file system to a backup system. The backup system stores the data received from the local client application to be utilized in the event of a corruption or failure at the computing device executing the local client data backup application.

When backing up the client data via current wireless solutions, problems due to the low bandwidth and security vulnerabilities arise. With the increase in demand for wireless communications and data transfers becoming larger, there is a need for a backup solution with higher bandwidth that is also more secure.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

To address the drawbacks of the current wireless solutions, embodiments of the invention make use of the advantages of the light fidelity (Li-Fi) networks over the current wireless networks (e.g., Wireless local area networking (WiFi)).

Figure 1:
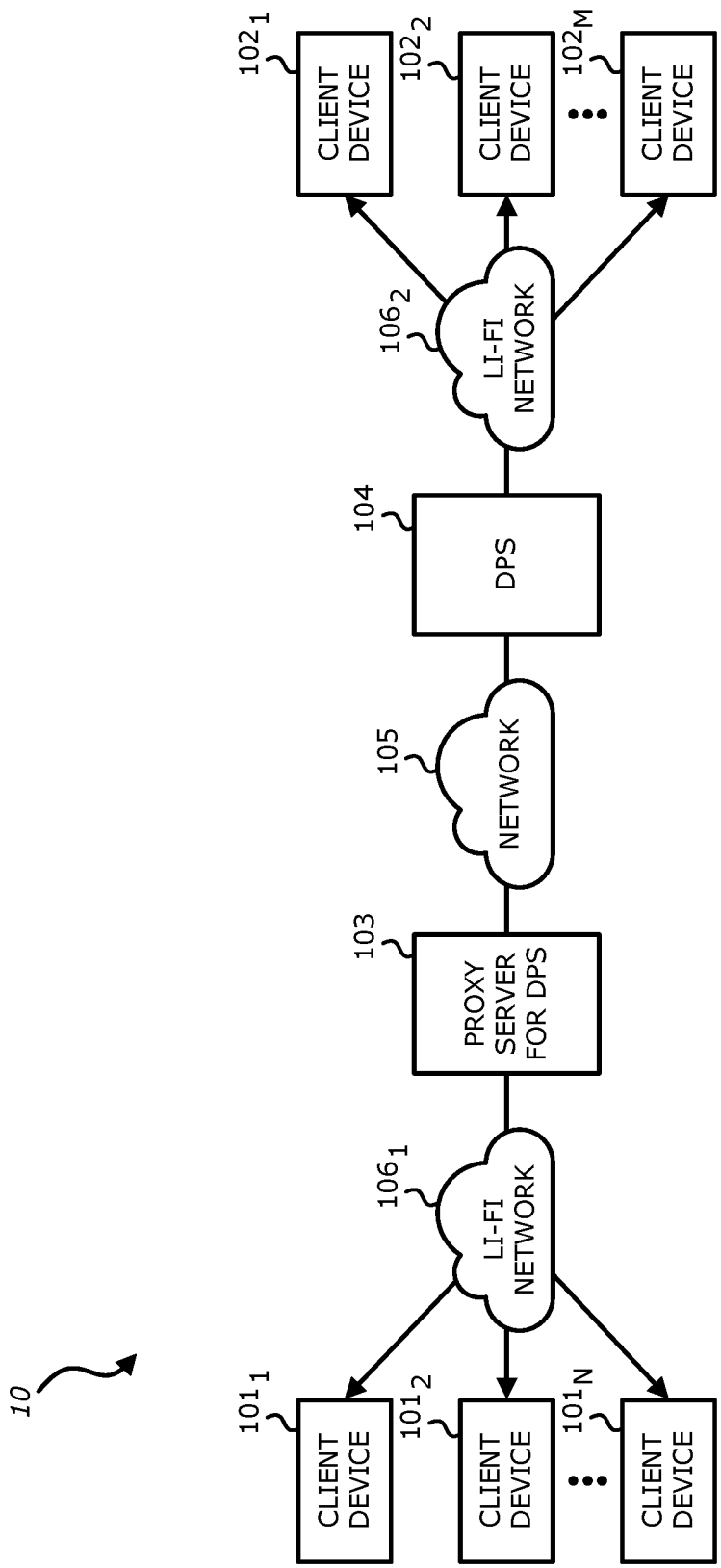
FIG. 1 is a block diagram illustrating an example a system to provide data protection through light fidelity network according to one embodiment of the invention.

FIG. 1 is a block diagram illustrating an example a system to provide data protection through light fidelity network according to one embodiment of the invention. The system 10 may be a networked system that includes a plurality of client devices $101_1$-$101_n$ (n>1) that are remote devices, a plurality of client devices $102_1$-$102_m$ (M>1) that are local devices, network 105, a data protection server (DPS) 104, a proxy server 103 for the DPS, and light fidelity (Li-Fi) networks $106_1$, $106_2$.

The DPS 104 is a server that manages and stores the backup data from client devices $101_1$-$101_n$, $102_1$-$102_m$ in the system 10. The client devices $101_1$-$101_n$, $102_1$-$102_m$ may also include client systems. The proxy server 103 acts as a mediator between the DPS 104 and the client devices $101_1$-$101_n$, $102_1$-$102_m$. The proxy server 103 may be hosted in a remote area connected with a cloud or may be a stand-alone data protection server. As shown in FIG. 1, the DPS 104 and the proxy server 103 are coupled via the trusted and/or un-trusted network 105. The network 105 may be physically located in a secure location to be trusted or may be trusted according to secure connections based on cryptographic protocols, e.g., SSL (Secure Socket Layer), PVN (Private Virtual Networking), or other connections. The network 105 may be a cellular mobile phone network (e.g. a Global System for Mobile communications, GSM, network), including current 2G, 3G, 4G, 5G, LTE networks and their associated call and data protocols; and an IEEE 802.11 data network (WiFi or Wireless Local Area Network, WLAN).

The client devices $101_1$-$101_n$ are remote to the DPS 104 and thus, are coupled to a proxy server 103 in order to backup data to the DPS 104. The client devices $102_1$-$102_m$ are local to the DPS 104 and thus are directly coupled to the DPS 104. As shown in FIG. 1, the client devices $101_1$-$101_n$ are coupled to the proxy server 103 via a Li-Fi network $106_1$ and the client devices $102_1$-$102_m$ are coupled to the DPS 104 via a Li-Fi network $106_2$. The client devices $101_1$-$101_n$, $102_1$-$102_m$ as well as the DPS 104 and proxy server 103 are enabled with Li-Fi. In this embodiment, the client devices $101_1$-$101_n$, $102_1$-$102_m$ are able to backup their data through a Li-Fi network $106_1$, $106_2$, respectively, to the nearest backup server (e.g., proxy server 103, DPS 104) that is Li-Fi enabled (e.g., hosted with an illumination device and wireless enabled). The client devices $101_1$-$101_n$, $102_1$-$102_m$ may also be enabled with Li-Fi search for the a server providing data protection that is enabled with Li-Fi (e.g., DPS 104, proxy server 103). Although FIG. 1 illustrates a single proxy server 103, it is understood that a plurality of proxy server 103 may be included in the system 10.

Li-Fi is a bidirectional fully-networked wireless communication technology that uses visible light to transmit and receive data. In some embodiments, to be Li-Fi enabled, the client devices $101_1$-$101_n$, $102_1$-$102_m$, DPS 104, and proxy server 103 may include at least one illumination device (e.g., light emitting diode (LED)) to transmit data to one another. In one embodiment, the current to the LED is turned on and off at a high rate to transmit binary data. In one embodiment, the LED transmits in parallel a plurality of data streams of binary data. The high rate at which the LED is turned on and off renders this change unnoticeable to the human eye.

Data transmissions between the client devices $101_1$-$101_n$, $102_1$-$102_m$ and the proxy server 103 and DPS 104, respectively, are more secure to cyber attacks since the visible light data transmissions cannot penetrate walls. In other words, the transmissions are shorter in range and thus, more robust to hacking. Moreover, since the visible light spectrum is much larger than the radio frequency spectrum, the Li-Fi network $106_1$, $106_2$ provides a much higher bandwidth with which data transmission may occur (e.g., 100 times faster than WiFi).

Figure 2:
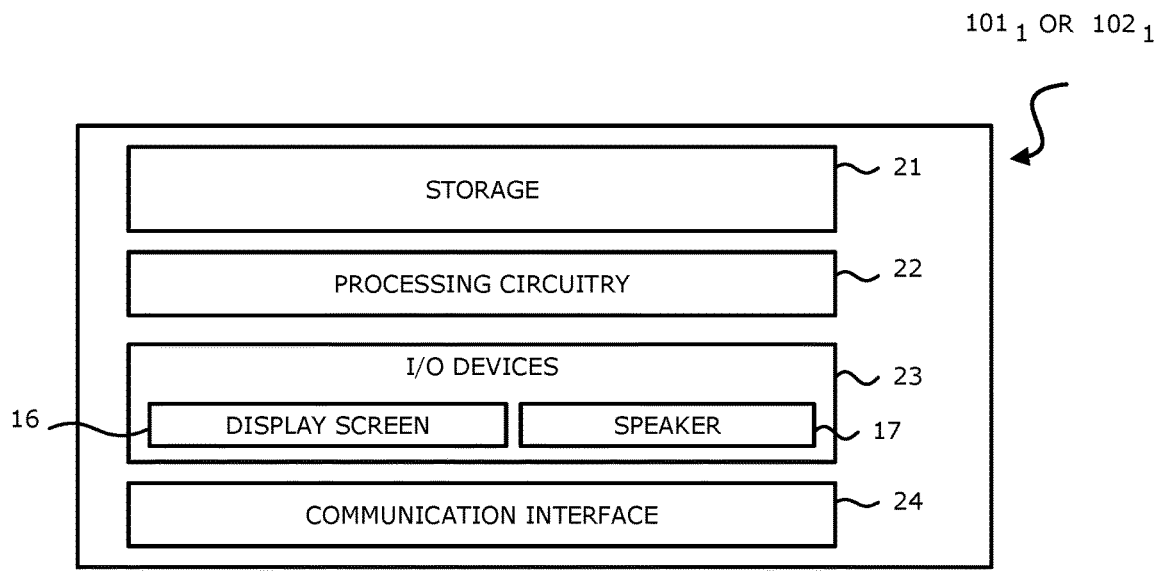
FIG. 2 is block diagram illustrating a client device included in the system of FIG. 1 according to one embodiment of the invention.

FIG. 2 is block diagram illustrating a client device (e.g., $101_1$ or $102_1$) included in the system 100 of FIG. 1 according to one embodiment of the invention. The client device $101_1$ or $102_1$ may be a mobile telephone communications device or a smartphone, a tablet computer, a laptop computer, a personal digital media player, or a notebook computer. It is understood that embodiments of the invention may also be implemented in a non-mobile or stationary device such as a compact desktop computer. As shown in FIG. 2, the client device $101_1$ or $102_1$ includes storage 21, a processing circuitry 22, input-output (I/O) devices 23 and a communication interface 24.

Input-output devices 23 allow the client device $101_1$ or $102_1$ to receive data as well as provide data. In one embodiment, input-output devices 23 may include audio devices, sensors, and user input-output devices. Using the user input-output devices, the user may supply commands to control the operations of the client device $101_1$ or $102_1$. Input-output devices 23 may include display screen 16 and audio devices such as speaker 17 that may contain audio-video interface equipment such as jacks and other connectors for external devices.

Input-output devices 23 may also include wireless communications devices having communications circuitry such as radio frequency (RF) transceiver circuitry, antennas, etc. In one embodiment, the microphone port, the speaker ports may be coupled to the communications circuitry to enable the user to participate in wireless telephone or video calls. A variety of different wireless communications networks and protocols may be supported in the wireless communications devices. These include: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN) which may also support wireless voice over internet protocol (VOIP) calling.

As shown in FIG. 2, the client devices $101_1$, $102_1$ also include the communication interface 24 may be an interface that is coupled to the Li-Fi network $106_1$, $106_2$ in order to receive data communications from the proxy setup server 103 or from the DPS 104, respectively, and transmit data communications to the proxy setup server 103 or to the DPS 104, respectively. The data communications being transmitted from the client devices $101_1$, $102_1$ may include (i) a request to backup data on the client device $101_1$, $102_1$ and (ii) the data from the client device $101_1$, $102_1$ to be backed up on the DPS 104. In one embodiment, the communication interface 24 in client device $101_1$ and $102_1$ includes an illumination device that transmits wireless data to the proxy server 103 and the DPS 104, respectively, via the Li-Fi network $106_1$, $106_2$, respectively. The illumination device may be a light emitting diode (LED). In one embodiment, the communication interface 24 of the client device $101_1$ and $102_1$ also includes a receiver to receive the data transmissions that are transmitted by an illumination device and received through the Li-Fi networks $106_1$, $106_2$, respectively. The communication interface 24 may also include a Li-Fi search device that searches for servers for data protection that are Li-Fi enabled such as the DPS 104 and proxy server 103.

The processing circuitry 22 included in the client device $101_1$ or $102_1$ may include a processor, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing circuitry 22 may be used to control the operations of client device $101_1$ or $102_1$ by executing software instructions or code stored in the storage 21. The storage 21 may include one or more different types of storage such as hard disk drive storage, nonvolatile memory, and volatile memory such as dynamic random access memory. In some cases, a particular function as described below may be implemented as two or more pieces of software in the storage 21 that are being executed by different hardware units of a processor.

The processing circuitry 22 (or simply processor) may execute instructions stored in the storage 21 which cause the processor 22 to perform a method to provide data protection through Li-Fi network as described below. The processor 22 may also execute software stored in the storage 21 that uses the wireless communications functionality of the client device $101_1$ or $102_1$ to initiate an outgoing call and/or send a Short Message Services, SMS, text message, to establish a TCP/IP connection (over a wireless link) with a remote server over the network 105 (e.g., Internet), or to establish a connection over a Li-Fi network $106_1$, $106_2$ to a server (e.g., DPS 104 or proxy server 103).

Figure 3:
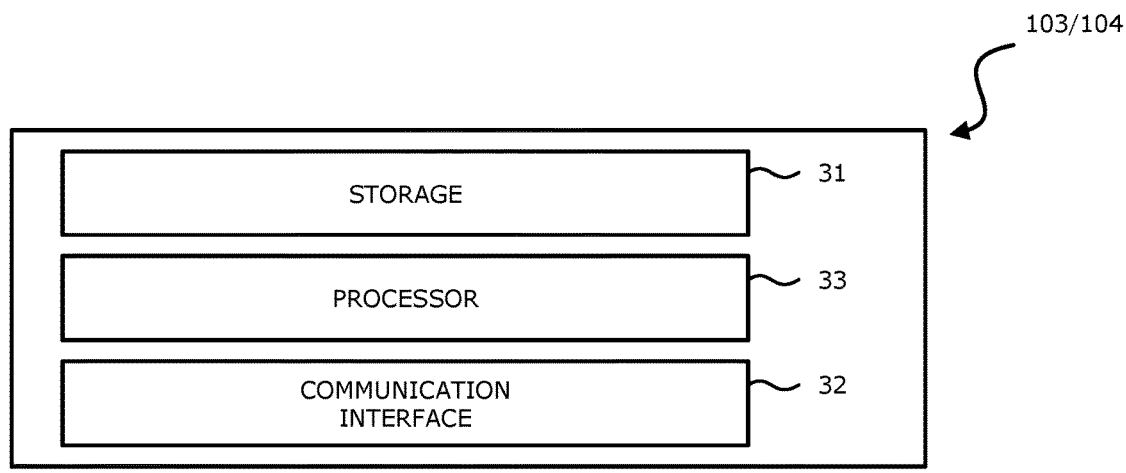
FIG. 3 is a block diagram illustrating a data protection server (DPS) or a proxy server for the DPS from FIG. 1 according to one embodiment of the invention.

FIG. 3 is a block diagram illustrating a data protection server (DPS) 104 or a proxy server 103 for the DPS 104 from FIG. 1 according to one embodiment of the invention. The DPS 104 and the proxy server 103 may include storage 31, a communication interface 32, and a processor 33.

The communication interface 32 may be an interface that is coupled to the network 105 in order to receive communications. For example, the DPS 104's communication interface may be coupled to the network 105 to receive communications from the proxy server 103. In one embodiment, through the network 105, the DPS 104's communication interface 32 may receive a registration request from the proxy server 103, a backup request from one of the remote client devices $101_1$-$101_n$ via the proxy server 103, or backup data from the remote client devices $101_1$-$101_n$ via the proxy server 103.

The communication interface 32 of proxy server 103 and DPS 104 may also be interfaces that are coupled to Li-Fi networks $106_1$, $106_2$, respectively, in order to transmit and receive communications to and from the remote client devices $102_1$-$102_m$ and the local client devices $101_1$-$101_n$, respectively. In one embodiment, the communication interface 32 of proxy server 103 and DPS 104 includes a receiver and an illumination device (e.g., LED). In one embodiment, the illumination device in the proxy server 103 and DPS 104 transmits wireless data communications to remote client devices $102_1$-$102_m$ and the local client devices $101_1$-$101_n$, respectively, via the Li-Fi network $106_1$, $106_2$, respectively. In one embodiment, the communication interface 32 of the proxy server 103 and the DPS 104 includes receivers to respectively receive the data transmissions that are transmitted by the illumination device of client device $101_1$ and $102_1$ and received through the Li-Fi networks $106_1$, $106_2$, respectively. The receiver of the communication interface 32 may also receive search beacons or requests from the client devices' Li-Fi search devices. The receiver of the communication interface 32 may respond to the search beacons or requests with a response that signals its identity to the client device. Using this identification signal, the client device may then request a data backup to the identified proxy server 103 or DPS 104.

As shown in FIG. 3, the storage 31 is coupled to the communication interface 32. The storage 31 in the DPS 104 may store, for example, (i) the data to be backed up from the client devices $101_1$-$101_n$, $102_1$-$102_m$, and (ii) the registration of the proxy server 103. The storage 31 in the proxy server 103 may store, for example, the data to be backed up from the remote client devices $102_1$-$102_m$.

Referring to FIG. 3, the processor 33 may be coupled to the communication interface 32 and the storage 31. The processor 33 may be a microprocessor, a microcontroller, a digital signal processor, or a central processing unit. The term "processor" may refer to a device having two or more processing units or elements, e.g. a CPU with multiple processing cores. The processor 33 may be used to control the operations of DPS 104 or proxy server 103 by executing software instructions or code stored in the storage 31.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
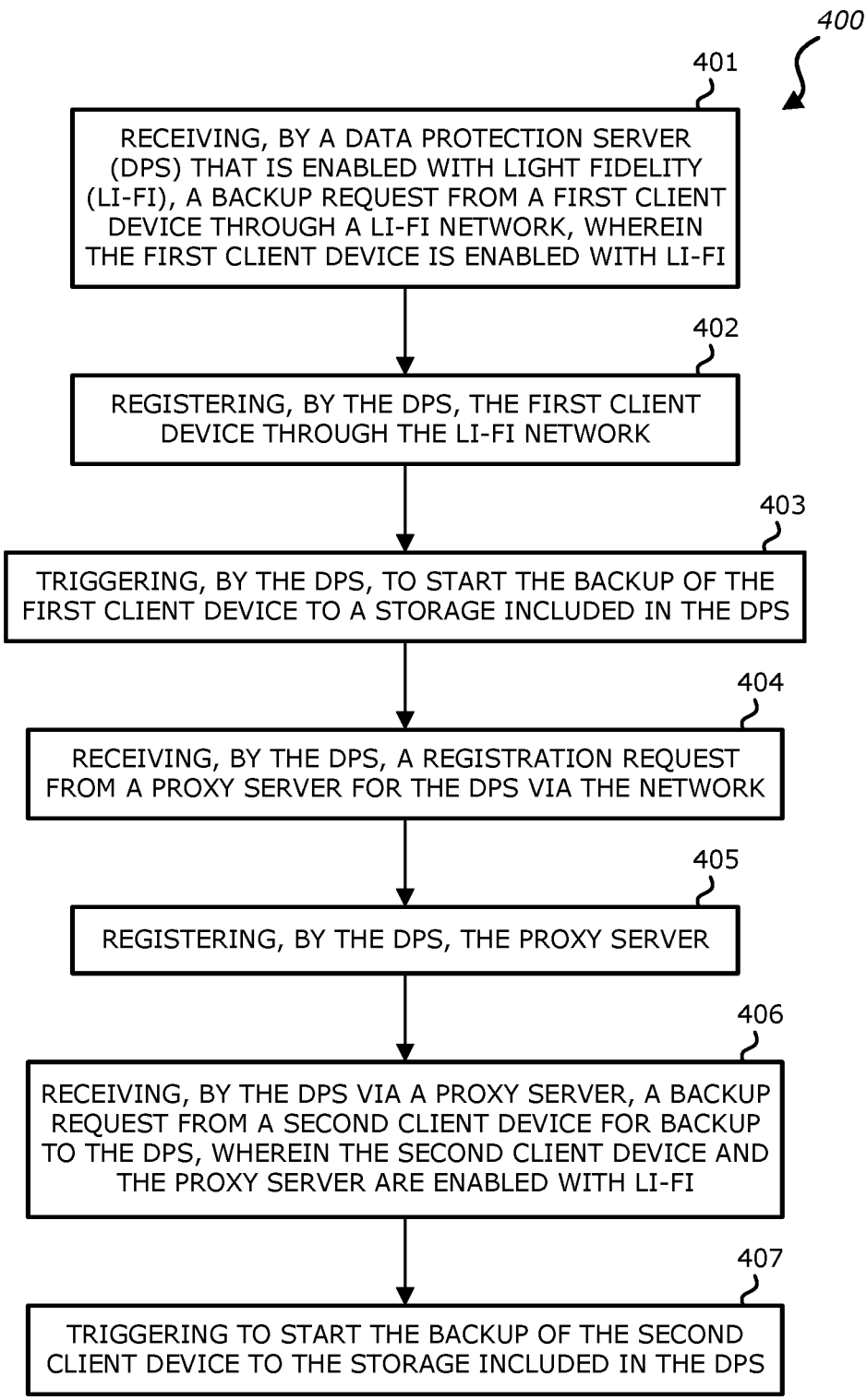
FIG. 4 illustrates an example flow diagram of a process to provide data protection through light fidelity network according to one embodiment of the invention.

FIG. 4 illustrates an example flow diagram of a process to provide data protection through light fidelity network according to one embodiment of the invention. The process 400 starts, at Block 401, with the DPS 104 that is enabled with Li-Fi receiving a backup request from a first client device (e.g., client device $102_1$) through a Li-Fi network (e.g., Li-Fi network $106_2$). In one embodiment, the first client device is local and may be enabled with Li-Fi. For example, the first client device may be included in the same local networking system as the DPS 104. In one embodiment, the backup request from the first client device is a wireless transmission of data using a first illumination device on the first client device. In this embodiment, the backup request being transmitted using the first illumination device is received by the DPS's communication interface 32 that includes a receiver and a second illumination device.

At Block 402, the DPS 104 registers the first client device through the Li-Fi network. In one embodiment, the registration of the first client device occurs instantly with the request for backup. At Block 403, the DPS 104 triggers to start the backup of the first client device to a storage included in the DPS 104. Using the Li-Fi capabilities of both the first client device and the DPS 104, the backup data from the first client device is securely and rapidly transmitted to the DPS 104 via the Li-Fi network $106_2$.

At Block 404, the DPS 104 receives a registration request from a proxy server 103 for the DPS 104 via the network 105. In some embodiments, the registration request includes the identification of the proxy server 103. The DPS 103 may verify the registration to determine the authenticity of the proxy server 103. In one embodiment, the registration of the proxy server 103 occurs instantly with the request.

At Block 405, the DPS 104 registers the proxy server 103 and at Block 406, the DPS 104 receives via the proxy server a backup request from a second client device (e.g., client device $101_1$) for backup to the DPS 104. In one embodiment, the second client device searches for the closest server that provides data protection that is Li-Fi enabled using a Li-Fi search device included in the second client device. The second client device may transmit a Li-Fi search signal or beacon. In this embodiment, the proxy server 103 receives the Li-Fi search signal or beacon and responds to the second client device by providing an identification signal. In one embodiment, the proxy server then receives the backup request from the second client device. In one embodiment, the second client device and the proxy server are enabled with Li-Fi. The second client device may be remote. In this embodiment, the second client device may be included in a networking system that is remote from the local networking system to which the DPS 104 belongs. As a remote device, the second client device establishes a connection to the DPS 104 via the proxy server 103. While remote to the DPS 104, the second client device is able to benefit from a Li-Fi connection to the proxy server 103. Due to the nature of Li-Fi, the second client device transmits securely and quickly (due to the high rate and bandwidth of Li-Fi) backup data to the proxy server 103 using the Li-Fi network $106_1$ and both the device and the proxy server 103's Li-Fi capabilities.

At Block 407, the DPS 104 triggers to start the backup of the second client device to the storage 32 included in the DPS 104.

Figure 5:
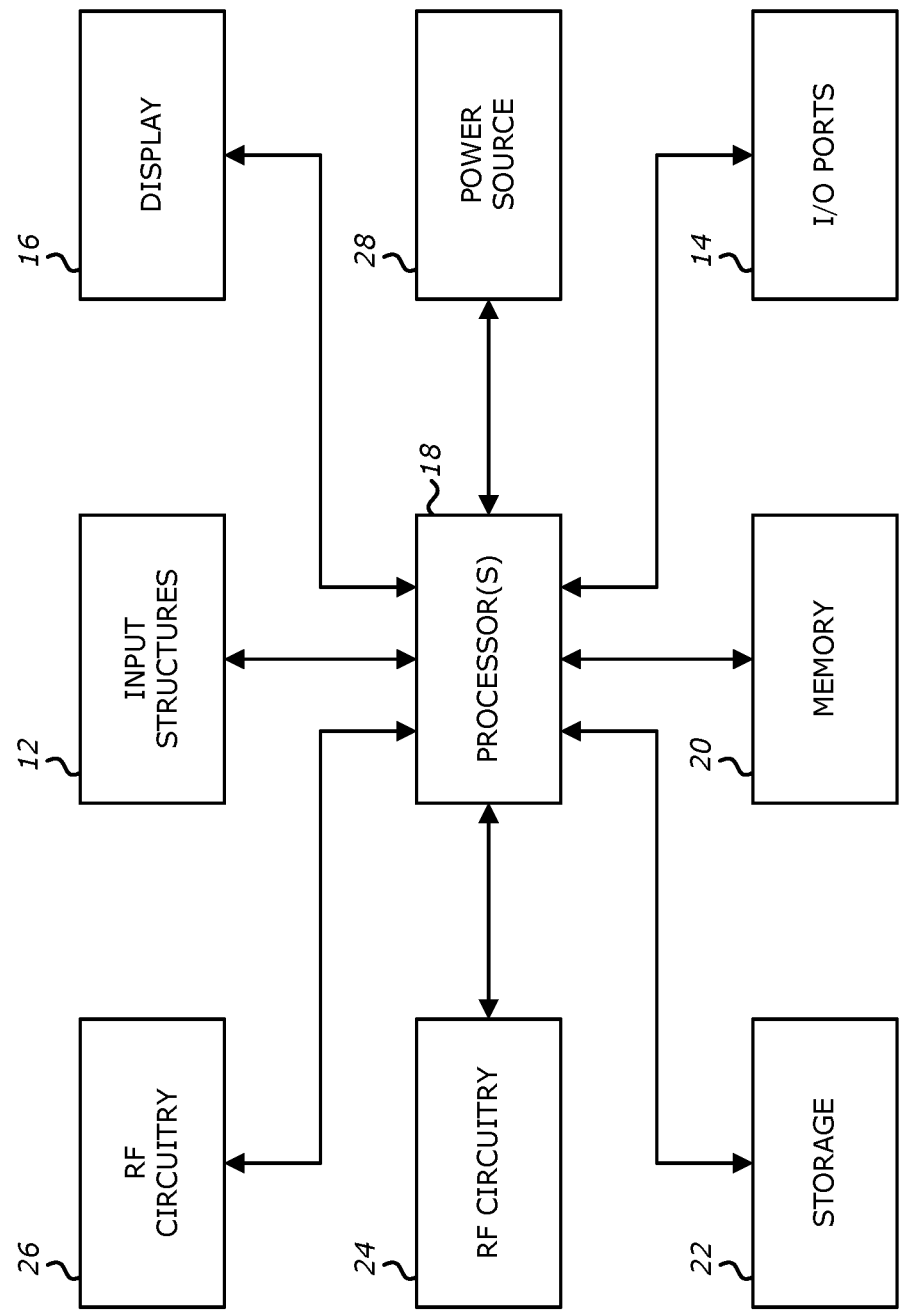
FIG. 5 is a block diagram of exemplary components of a client device (e.g., electronic device) in accordance with aspects of the present disclosure.

A general description of suitable electronic devices for performing these functions is provided below with respect to FIG. 5. Specifically, FIG. 5 is a block diagram depicting various components that may be present in electronic devices (e.g., client device $101_1$-$101_n$, $102_1$-$102_m$) suitable for use with the present techniques. The electronic device may be in the form of a computer, a handheld portable electronic device, and/or a computing device having a tablet-style form factor. These types of electronic devices, as well as other electronic devices providing comparable speech recognition capabilities may be used in conjunction with the present techniques.

Keeping the above points in mind, FIG. 5 is a block diagram illustrating components that may be present in one such electronic device (e.g., client device $101_1$-$101_n$, $102_1$-$102_m$), and which may allow the device to function in accordance with the techniques discussed herein. The various functional blocks shown in FIG. 5 may include hardware elements (including circuitry), software elements (including computer code stored on a computer-readable medium, such as a hard drive or system memory), or a combination of both hardware and software elements. It should be noted that FIG. 5 is merely one example of a particular implementation and is merely intended to illustrate the types of components that may be present in the electronic device (e.g., client device $101_1$-$101_n$, $102_1$-$102_m$). For example, in the illustrated embodiment, these components may include a display 16, input/output (I/O) ports 14, input structures 12, one or more processors 18, memory device(s) 20, non-volatile storage 22, expansion card(s) 24, RF circuitry 26, and power source 28.

In the embodiment of the electronic device (e.g., client device $101_1$-$101_n$, $102_1$-$102_m$) in the form of a computer, the embodiment include computers that are generally portable (such as laptop, notebook, tablet, and handheld computers), as well as computers that are generally used in one place (such as conventional desktop computers, workstations, and servers).

The electronic device (e.g., client device $101_1$-$101_n$, $102_1$-$102_m$) may also take the form of other types of devices, such as mobile telephones, media players, personal data organizers, handheld game platforms, cameras, and/or combinations of such devices. For instance, the device may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the electronic device (e.g., client device $101_1$-$101_n$, $102_1$-$102_m$) may also be provided in the form of a portable multi-function tablet computing device. In certain embodiments, the tablet computing device may provide the functionality of media player, a web browser, a cellular phone, a gaming platform, a personal data organizer, and so forth.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to provide data protection through a light fidelity (Li-Fi) network, comprising:
    receiving, at each of a plurality of proxy servers for a data protection server (DPS), a search signal from a remote client device, wherein the remote client device, the DPS, and each of the plurality of proxy servers are Li-Fi enabled and includes an illumination device to transmit data to one another;
    sending, by each of the plurality of proxy servers, identification information of the proxy server to the remote client device;
    receiving, at a proxy server of the plurality of proxy servers, a backup request from the remote client device through the Li-Fi network, wherein the proxy server that receives the backup request has a shortest physical distance to the remote client device among the plurality of proxy servers and the DPS, and wherein a Li-Fi search device is used to determine the proxy server that has the shortest physical distance to the remote client device;
    registering, by the DPS, the remote client device and the proxy server through the Li-Fi network in response to the proxy server receiving the backup request;
    receiving, at the proxy server, a backup of data from the remote client device, wherein the backup of data is to be transferred to a storage on the proxy server; and
    transmitting the backup of the data from the storage on the proxy server to a storage on the DPS.

2. The method of claim 1, wherein the backup request from the remote client device is a wireless transmission of data using a first illumination device on the remote client device and is received by the DPS's communication interface that includes a receiver and a second illumination device.

3. The method of claim 1, wherein the proxy server is remote from the DPS.

4. The method of claim 1, wherein the proxy server is coupled to the DPS through a physical network or an Internet network.

5. The method of claim 2, wherein the first and second illumination devices are light emitting devices (LED).

6. The method of claim 1, further comprising:
    receiving, at the DPS, a data backup request from a local client device, wherein the DPS is the closest backup server to the local client.

7. The method of claim 1, wherein the illumination device is a light emitting diode (LED).

8. A system to provide data protection through light fidelity (Li-Fi) network comprising:
a data protection server (DPS) that includes a processor, a storage, and a communication interface;
wherein the processor coupled to the storage is to:
receive, at each of a plurality of proxy servers for a data protection server (DPS), a search signal from a remote client device, wherein the remote client device, the DPS, and each of the plurality of proxy servers are Li-Fi enabled and includes an illumination device to transmit data to one another,
send, by each of the plurality of proxy servers, identification information of the proxy server to the remote client device,
receive, at a proxy server of the plurality of proxy servers, a backup request from the remote client device through the Li-Fi network, wherein the proxy server that receives the backup request has a shortest physical distance to the remote client device among the plurality of proxy servers and the DPS, and wherein a Li-Fi search device is used to determine the proxy server that has the shortest physical distance to the remote client device,
register, by the DPS, the remote client device and the proxy server through the Li-Fi network in response to the proxy server receiving the backup request,
receiving, at the proxy server, a backup of data from the remote client device, wherein the backup of data is to be transferred to a storage on the proxy server, and
transmitting the backup of the data from the storage on the proxy server to a storage on the DPS.

9. The system of claim 8, wherein the backup request from the remote client device is a wireless transmission of data using a first illumination device on the remote client device and is received by the DPS's communication interface that includes a receiver and a second illumination device.

10. The system of claim 8, wherein the proxy server is coupled to the DPS through a physical network or an Internet network.

11. The system of claim 8, wherein the proxy server is remote from the DPS.

12. The system of claim 9, wherein the first and the second illumination devices are light emitting devices (LED).

13. The system of claim 8, wherein the DPS receives a data backup request from a local client, the DPS being the closest backup server to the local client.

14. A non-transitory computer-readable storage medium having stored thereon instructions, when executed by a processor, causes the processor to perform a method to provide data protection through light fidelity (Li-Fi) network comprising:

receiving, at each of a plurality of proxy servers for a data protection server (DPS), a search signal from a remote client device, wherein the remote client device, the DPS, and each of the plurality of proxy servers are Li-Fi enabled and includes an illumination device to transmit data to one another;

sending, by each of the plurality of proxy servers, identification information of the proxy server to the remote client device;

receiving, at a proxy server of the plurality of proxy servers, a backup request from the remote client device through the Li-Fi network, wherein the proxy server that receives the backup request has a shortest physical distance to the remote client device among the plurality of proxy servers and the DPS, and wherein a Li-Fi search device is used to determine the proxy server that has the shortest physical distance to the remote client device;

registering, by the DPS, the remote client device and the proxy server through the Li-Fi network in response to the proxy server receiving the backup request;

receiving, at the proxy server, a backup of data from the remote client device, wherein the backup of data is to be transferred to a storage on the proxy server; and transmitting the backup of the data from the storage on the proxy server to a storage on the DPS.

15. The computer-readable storage medium of claim 14, wherein the backup request from the remote client device is a wireless transmission of data using a first illumination device on the remote client device and is received by the DPS's communication interface that includes a receiver and a second illumination device.

16. The computer-readable storage medium of claim 14, wherein the proxy server is remote from the DPS.

17. The computer-readable storage medium of claim 14, wherein the proxy server is coupled to the DPS through a physical network or an Internet network.

18. The computer-readable storage medium of claim 15, wherein the first and the second illumination devices are light emitting devices (LED).

19. The computer-readable storage medium of claim 14, wherein the method further comprises:
receiving, at the DPS, a data backup request from a local client device, wherein the DPS is the closest backup server to the local client.

20. The computer-readable storage medium of claim 14, wherein the DPS receives a data backup request from a local client, the DPS being the closest backup server to the local client.

* * * * *